March 5, 1963 P. CARDI 3,079,974
PRESSURE EQUALIZING VALVE
Filed March 3, 1961

INVENTOR.
PAUL CARDI
BY
ATTORNEY

3,079,974
PRESSURE EQUALIZING VALVE
Paul Cardi, 1375 Park Ave., Cranston, R.I.
Filed Mar. 3, 1961, Ser. No. 93,215
3 Claims. (Cl. 152—415)

My present invention relates to tire valves and more particularly to a novel construction of a pressure equalizing valve.

The principal object of the present invention is to provide a pressure equalizing valve which will permit the equalization of pressure in dual tires during the operation of the vehicle.

Another object of the present invention is to provide a pressure equalizing valve which permits individual inflation and pressure readings on dual tires.

A further object of the present invention is to provide a valve which will balance the pressure in a pair of dual tires to prevent blowouts and excessive wear.

Another object of the present invention is to provide a pressure equalizing valve which will automatically shut off if one of the dual tires loses its air.

With the above and other objects and advantageous features in view my invention consists of a novel arrangement of parts more fully disclosed in the detailed description following in conjunction with the accompanying drawings and more particularly defined in the appended claims.

Dual tires have given considerable trouble because of the impossibility of properly balancing the air pressure to meet different road conditions. In existing equalizing valves the tires are made to balance so that if one should leak the valve shuts off itself at certain minimum pressures. However, on vehicles having tandem driving axles where both axles are driven, it is important to maintain all pressures equally. If one tire softens, it is essential that the other of the dual tires maintain the pressure. Otherwise the radius will change and cause a strain on the differentials, somethimes referred to as "gear fight." Furthermore, tires having steel cords cannot be run soft. Therefore, although pressure equalization is desirable, it is essential that if one tire goes soft that the other maintain full pressure. The present invention therefore provides a pressure equalizing valve which will equalize the pressure under normal running conditions, but will immediately shut off should the air bleed from either of the dual tires.

Figure 1:
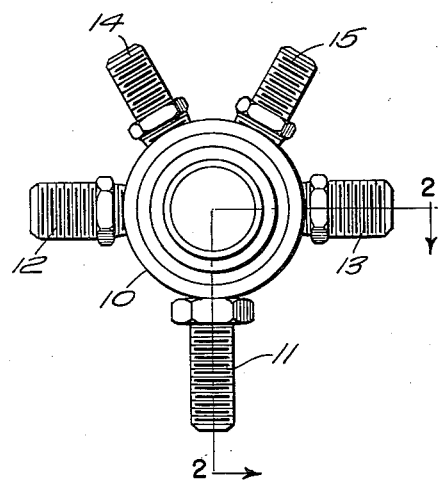
FIG. 1 is a top plan view of a pressure equalizing valve embodying my invention.

Referring more in detail to the drawings, FIG. 1 shows the general arrangement of the valve. The body of the valve 10 is generally cylindrical in form and is provided at one side with a mounting post 11 for attachment to the spoke of the outer wheel of a pair of dual wheels. This actually is the back of the valve. At right angles to the post 11, the body portion 10 is provided with valve stems 12 and 13 extending from diametrically opposite sides. The valve stems 12 and 13 are connected to the individual tire valves preferably by means of the safety hose shown in my copending application Serial No. 833,018, filed Aug. 11, 1959, now Patent No. 3,039,793, June 19, 1962. The front of the body portion 10 is provided with equally spaced valve stems 14 and 15 which are used for inflating the tires and for taking pressure readings. The valve stem 14 communicates through the valve with the tire connected to the stem 12, and the valve stem 15 communicates through the valve with the tire connected to the stem 13.

Figure 2:
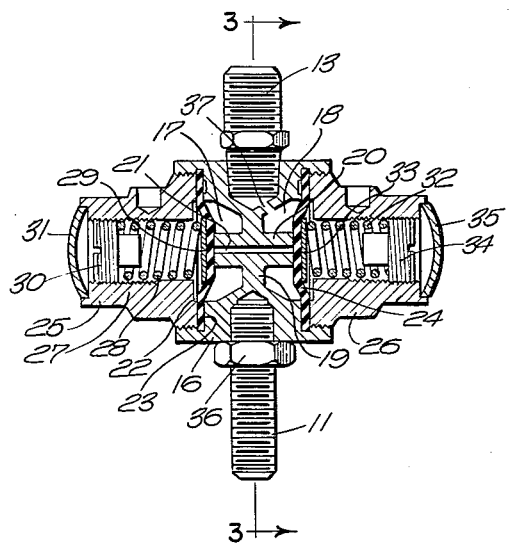
FIG. 2 is a section taken on line 2—2 on FIG. 1.
Figure 3:
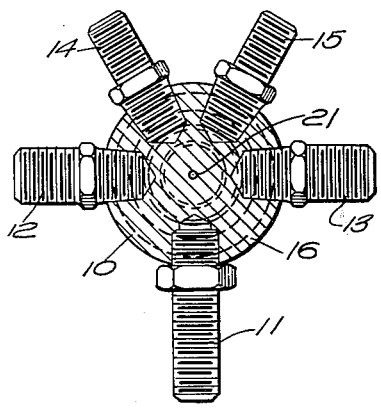
FIG. 3 is a section taken on line 3—3 on FIG. 2.

Referring to FIG. 2, the body of the valve 10 comprises a central cylindrical portion 16 divided into annular chambers 17 and 18. The dividing wall 19 is provided with an integral annular cross member 20 which extends into each chamber. The member 20 is provided with a central passageway 21 which provides communication between the chambers 17 and 18. Now the central cylindrical portion 16 is provided adjacent the chamber 17 with a diaphragm 22 made of flexible material such as rubber or plastic. The diaphragm 22 rests on a shoulder 23 and closes the chamber 17. A similar diaphragm 24 closes the chamber 18. An annular housing 25 is threaded into the cylindrical portion 16 and engages the outer edge of the diaphragm 22 clamping it on to the shoulder 23. On the opposite side a housing 26 clamps the diaphragm 24. The housing 25 is provided with a large central base 27 internally threaded. A heavy coil spring 28 is positioned in the base its inner end bearing against a washer 29 which in turn bears against the central portion of the diaphragm 22 and normally pushes the diaphragm against the end of the passageway 21 sealing the same. Tension on the spring 28 is regulated by an adjustment screw 30 which is threaded into the bore 27. A metal cap 31 is snapped over the outer end of the bore to seal out dust and is readily removable for adjusting the screw 30. At the opposite side the housing 26 is provided with a similar spring 32, washer 33, adjustment screw 34 and seal 35.

The mounting post 11 comprises a headless screw which is threaded at right angles into the cylindrical portion 16 and locked by a nut 36. FIG. 2 illustrates the mounting of the valve stem 13 which is also threaded into the cylindrical portion 16 but communicates through a passageway 37 with the chamber 18. Similarly the stem 12 communicates with the chamber 17. The valve stems 14 and 15 are also similarly mounted with the valve stem 14 communicating with the chamber 17 and the valve stem 15 communicating with the chamber 18.

With the parts assembled as described it is obvious that the chambers 17 and 18 are in direct communication through the passageway 21, each end of the passageway being controlled by one of the diaphragms. Now if air pressure is applied to the valve stem 14 it will pass through the chamber 17 and into the valve stem 12 and to one of the dual tires. Similarly if air pressure is applied to the valve stem 15 it will pass through the chamber 18 into the valve stem 13 and into the other of the dual tires. It is thus necessary to inflate each tire separately. Now assuming that the pressure at which these tires are normally inflated is approximately 75 pounds. Each spring 28 and 32 is adjusted by turning the set screws 30 and 34 so that the pressure necessary to lift the diaphragm from the ends of the passageway 21 is 75 pounds. Therefore, as the tire is inflated and the pressure builds up towards the 75 pounds the diaphragms will be lifted from the ends of the passageway by the pressure in each chamber. This permits the free flow of air from one chamber to another and therefore from one tire to another. When the vehicle is running and the pressure builds up because of an uneven road and the heating of one tire the pressure will equalize to the other tire. This insures an even wear on both tires and prevents blowouts and damage due to over inflation. If a leak should develop in one tire the air will leak out and the pressure will reduce to below 75 pounds. At this point the diaphragm will close and the leakage will be confined to one tire only. This is important in the new steel cored tires which can be greatly damaged if they are under inflated but can stand a considerable amount of over inflation without blowing out. Since the passageway 21 is small, the pressure in one chamber can build up to over 100 pounds and will lift the diaphragm in that chamber, but it will not lift the diaphragm in the opposite chamber if the pressure in the other tire is below the minimum set pressure. If desired, a differential can be set up between the shut-off and operating pressures.

The valve of the present invention therefore provides for a balancing of the pressures in the dual tires under various road conditions with the safety feature that it will shut off at a safe level of minimum pressure. When both tires are above the minimum pressure both diaphragms will be floating. Under such conditions both tires can be inflated from either of the stems 14 and 15 and a pressure check with a tire gage can be made from either stem 14 or 15. However, if one or both of the tires have reached a minimum level sufficient to close the diaphragms, then the tires must be individually inflated and a separate pressure check can be made for each tire at each valve stem.

The valve of the present invention is extremely simple in construction and easy to manufacture and assemble. Once installed its operation is automatic and requires no attention or maintenance. It reduces danger of blowouts and fire and provides for an even wear on both tires. Other advantages of the present invention will be readily apparent to a person skilled in the art.

I claim:

1. A pressure equalizing valve for dual tires comprising a housing, a central wall portion separating said housing into two equal chambers, an integral transverse portion extending from said central wall portion into each of said chambers, said transverse portion having a passageway extending therethrough and communicating with said chambers, valve means in each chamber controlling the passage of air from each chamber through said passageway, an air inlet in each chamber communicating with one of the dual tires, and a second air inlet in each chamber for introducing air under pressure to said chamber, said valve means including a flexible diaphragm mounted in each chamber and adapted to seat over the end of the passageway.

2. A pressure equalizing valve for dual tires comprising a housing, a central wall portion separating said housing into two equal chambers, an integral transverse portion extending from said central wall portion into each of said chambers, said transverse portion having a passageway extending therethrough and communicating with said chambers, valve means in each chamber controlling the passage of air from each chamber through said passageway, an air inlet in each chamber communicating with one of the dual tires, and a second air inlet in each chamber for introducing air under pressure to said chamber, said valve means including a flexible diaphragm mounted in each chamber and adapted to seat over the end of the passageway, and an adjustable spring mounted over each diaphragm to resiliently urge said diaphragm toward said passageway opening.

3. A pressure equalizing valve for dual tires comprising a housing, a central wall portion separating said housing into two equal chambers, an integral transverse portion extending from said central wall portion into each of said chambers, said transverse portion having a passageway extending therethrough and communicating with said chambers, valve means in each chamber controlling the passage of air from each chamber through said passageway, an air inlet in each chamber communicating with one of the dual tires, and a second air inlet in each chamber for introducing air under pressure to said chamber, said valve means closing said passageway at a predetermined minimum pressure and opening said passageway at pressures exceeding said minimum, said valve means including a flexible diaphragm mounted in each chamber and adapted to seat over the end of the passageway, and an adjustable spring mounted over each diaphragm to resiliently urge said diaphragm toward said passageway opening.

References Cited in the file of this patent

UNITED STATES PATENTS

| | | |
|---|---|---|
| 1,882,455 | Spicer | Oct. 11, 1932 |
| 2,789,617 | Cardi | Apr. 23, 1957 |